United States Patent
Terry

(10) Patent No.: US 8,743,713 B2
(45) Date of Patent: Jun. 3, 2014

(54) BI-DIRECTIONAL REPEATER WITH A QUALITY OF SERVICE (QOS) INDICATOR

(75) Inventor: Scott Terry, Pleasanton, CA (US)

(73) Assignee: ZBoost, LLC, Norcross, GA (US)

( * ) Notice: Subject to any disclaimer, the term of this patent is extended or adjusted under 35 U.S.C. 154(b) by 146 days.

(21) Appl. No.: 12/779,394

(22) Filed: May 13, 2010

(65) Prior Publication Data
US 2011/0280138 A1     Nov. 17, 2011

(51) Int. Cl.
*G01R 31/08* (2006.01)
(52) U.S. Cl.
USPC .......................................... 370/252
(58) Field of Classification Search
USPC ......... 370/203, 204–215, 216–228, 229–240, 370/241–253, 254–271, 310–337, 338–350, 370/395.3, 395.4, 395.41, 395.42, 395.5, 370/395.52, 431–457, 458–463, 464–497, 370/498–522, 521–529
See application file for complete search history.

(56) References Cited

U.S. PATENT DOCUMENTS

| | | | | |
|---|---|---|---|---|
| 6,353,729 | B1 * | 3/2002 | Bassirat | 455/11.1 |
| 6,785,513 | B1 * | 8/2004 | Sivaprakasam | 455/63.1 |
| 7,796,524 | B1 * | 9/2010 | O'Connell et al. | 370/241 |
| 8,023,886 | B2 * | 9/2011 | Rofougaran | 455/7 |
| 2004/0185786 | A1 * | 9/2004 | Mirbaha et al. | 455/67.11 |
| 2005/0254442 | A1 * | 11/2005 | Proctor et al. | 370/294 |
| 2010/0285739 | A1 * | 11/2010 | Wang et al. | 455/9 |
| 2011/0110261 | A1 * | 5/2011 | Frenger | 370/252 |

* cited by examiner

*Primary Examiner* — Jung-Jen Liu
(74) *Attorney, Agent, or Firm* — Cantor Colburn LLP

(57) ABSTRACT

The invention relates to a method for determining a quality of service (QoS). A received signal strength indicator (RSSI) value associated with a downlink signal, a gain of a downlink power amplifier, and an increase in the RSSI value received by the mobile device associated with the downlink signal are determined. The QoS based on at least one of the RSSI value, the gain, and the increase in RSSI value received by the mobile device is determined and displayed to the user.

17 Claims, 6 Drawing Sheets

BI-DIRECTIONAL REPEATER WITH A QUALITY OF SERVICE (QOS) INDICATOR

BACKGROUND OF THE INVENTION

The present invention relates to the field of wireless communications. More specifically, the present invention relates to repeaters used in wireless communications networks. In particular, the present invention relates to a repeater with a quality of service (QoS) indicator.

Cellular communication is one of the widely known types of wireless communications. In a cellular communication system, a geographical area is divided into a plurality of cells. Each cell has a base station that communicates with one or more mobile devices in the cell. The mobile devices can include cellular phones, personal digital assistants (PDAs), and notebook personal computers. Signals transmitted from the base station to a mobile device are known as downlink signals. Signals transmitted from the mobile device to the base station are known as uplink signals.

In cellular communication networks, there exist areas within a cell where the reception of downlink signals from the base station to a mobile device may be poor. Such areas may include, but are not limited to, tall buildings, car parking basements and residential areas with poor network coverage. Mobile devices operating in such areas often face connectivity problems that results in frequent call interruptions. Hence, wireless devices such as repeaters are used to improve the network coverage in such areas. A repeater amplifies downlink signals from a base station and re-transmits them to the mobile device. Likewise, the repeater amplifies uplink signals from a mobile device and re-transmits them to the base station.

Thus, the repeater provides gain to the signals of the mobile communication network to increase the network coverage. The amplification of the signals provides better user experience by ensuring uninterrupted calls and reduced call drop rate. Another important parameter associated with a call is quality of service (QoS). The term Quality of Service (QoS) is defined in the recommendation E.800 of International Telecommunication Union (ITU) as: "the collective effort of the service performance which determines the degree of satisfaction of the end-user". The above definition encompasses several QoS parameters that finally decide the level of end-user experience. Received signal strength indicator (RSSI) value associated with a downlink signal can be considered as an important QoS parameter. Further, QoS parameters may include parameters related to call drop rate, bit error rate (BER), modulation technique used, network congestion and the like.

Existing repeaters have been equipped with displays to indicate the RSSI value associated with a downlink signal at the repeater. Such a display provides the user with the information of the signal strength received by the repeater.

However, such a display does not provide any information regarding the QoS offered to the user. Thus, a need exists in the prior art to provide a QoS indicator that displays QoS offered to the user at a location. The knowledge of QoS would be of greater interest to the user as it would be more effective in deciding the location of the repeater than the knowledge of RSSI value associated with a downlink signal at the repeater. Moreover, such a QoS indicator is of great help to the user for future relocations of the repeater.

SUMMARY

An object of the present invention is to provide a method for determining quality of service (QoS) for a downlink signal in a bi-directional repeater based on the received signal strength indicator (RSSI) value associated with a downlink signal and a gain of a downlink power amplifier.

To achieve the above-mentioned objective, various embodiments of the present invention provide a method for determining QoS. An RSSI value associated with a downlink signal is determined. Further, a gain of a downlink power amplifier is determined. The QoS indicator is determined based on the RSSI value associated with the downlink signal and the gain of the downlink power amplifier. Further, an increase in the RSSI value received by the mobile device associated with the downlink signal is calculated. The increase in the RSSI value is with respect to an RSSI value received by the mobile device associated with the downlink signal received by the mobile device without the bi-directional repeater. The QoS may also be determined based on this increase in the RSSI value associated with the downlink signal.

In another embodiment of the present invention, a bi-directional repeater is provided. The bi-directional repeater comprises a downlink circuit for amplifying downlink signals from a base station to a mobile device, and an uplink circuit for amplifying uplink signals from the mobile device to the base station. Further, the bi-directional repeater comprises a central processing unit (CPU) for obtaining the RSSI value associated with the downlink signal and for determining the gain of the downlink power amplifier. The CPU further determines an increase in the RSSI value received by the mobile device associated with the downlink signal based on an RSSI value associated with the downlink signal and the gain of the downlink power amplifier. The increase in the RSSI value is with respect to an RSSI value received by the mobile device associated with the downlink signal received by the mobile device without the bi-directional repeater. Still further, the bi-directional repeater comprises a memory unit for storing at least one of the RSSI value, the gain, and the increase in RSSI, and a display unit for displaying QoS.

BRIEF DESCRIPTION OF THE DRAWINGS

Various embodiments of the invention will hereinafter be described in conjunction with the appended drawings provided to illustrate and not to limit the invention, wherein like designations denote like elements, and in which.

DETAILED DESCRIPTION OF THE INVENTION

Various embodiments of the present invention provide a method and system for determining quality of service (QoS) for a downlink signal in a bidirectional repeater. Firstly, a received signal strength indicator (RSSI) value associated with a downlink signal is determined. Thereafter, a gain of a downlink power amplifier is determined. Subsequently, QoS is determined based on the RSSI value associated with a downlink signal and the gain of the downlink power amplifier. Further, an increase in the RSSI value received by the mobile device is estimated using the RSSI value and the gain. The increase in the RSSI value is with respect to an RSSI value received by the mobile device associated with the downlink signal received by the mobile device without the bi-directional repeater. The QoS may also be determined based on the increase in the RSSI value received by the mobile device.

Figure 1:
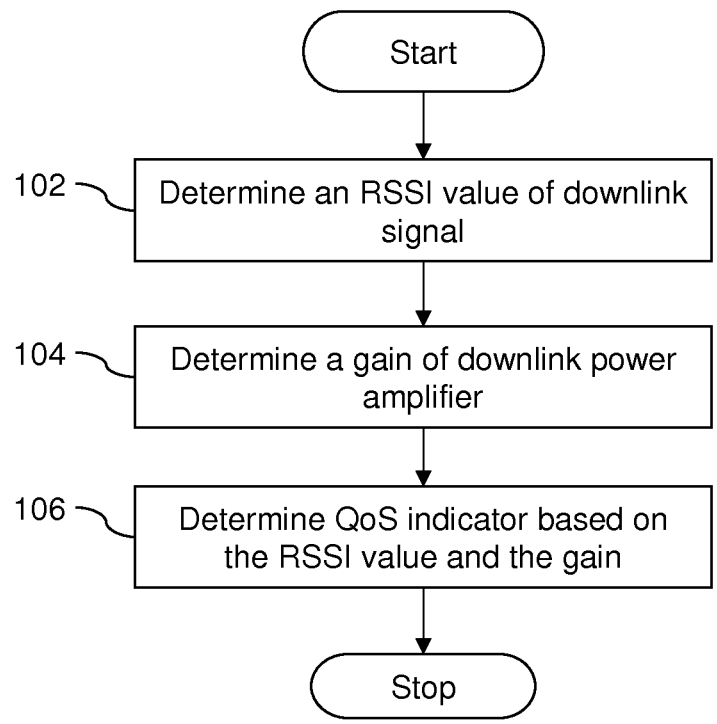
FIG. 1 is a flowchart illustrating a method for determining the quality of service (QoS) for a downlink signal in a bidirectional repeater, in accordance with an embodiment of the present invention.

FIG. 1 is a flowchart illustrating a method for determining QoS for a downlink signal in a bidirectional repeater, in accordance with an embodiment of the present invention. At step 102, a received signal strength indicator (RSSI) value associated with the downlink signal is determined. At step 104, a gain of the downlink power amplifier is determined. Thereafter, at step 106, the QoS for a downlink signal in a bidirectional repeater is determined based on the RSSI value and the gain of the downlink power amplifier. In an embodiment of the present invention, the RSSI value associated with a downlink signal is measured in absolute decibel units (dBm). The gain of the downlink power amplifier is measured in decibels (dB). In an exemplary embodiment of the present invention, a plurality of RSSI values associated with a downlink signal are determined. Subsequently, a QoS corresponding to each of the plurality of RSSI values is experimentally determined for different gain values of the downlink power amplifier. The plurality of RSSI values and the different gain values and the QoS corresponding to the plurality of RSSI values are stored in a memory within the bi-directional repeater. The above process is executed during the development stage of the bidirectional repeater. Subsequently, when the repeater is installed at a customer site, QoS corresponding to the RSSI value associated with a downlink signal and the gain of the downlink power amplifier is interpolated using the pre-recorded values. The method of interpolating the QoS is explained in detail in conjunction with FIG. 3.

In an alternative embodiment of the present invention, the QoS is estimated based on the measured values of at least one of the bit error rate (BER), word error rate (WER), frame error rate (FER), energy-to-interference density ratio (Ec/Io), received strength code power (RSCP), channel quality indicator (CQI) or other quality indicators. In an embodiment of the present invention, the QoS may be displayed by the bi-directional repeater.

Figure 2:
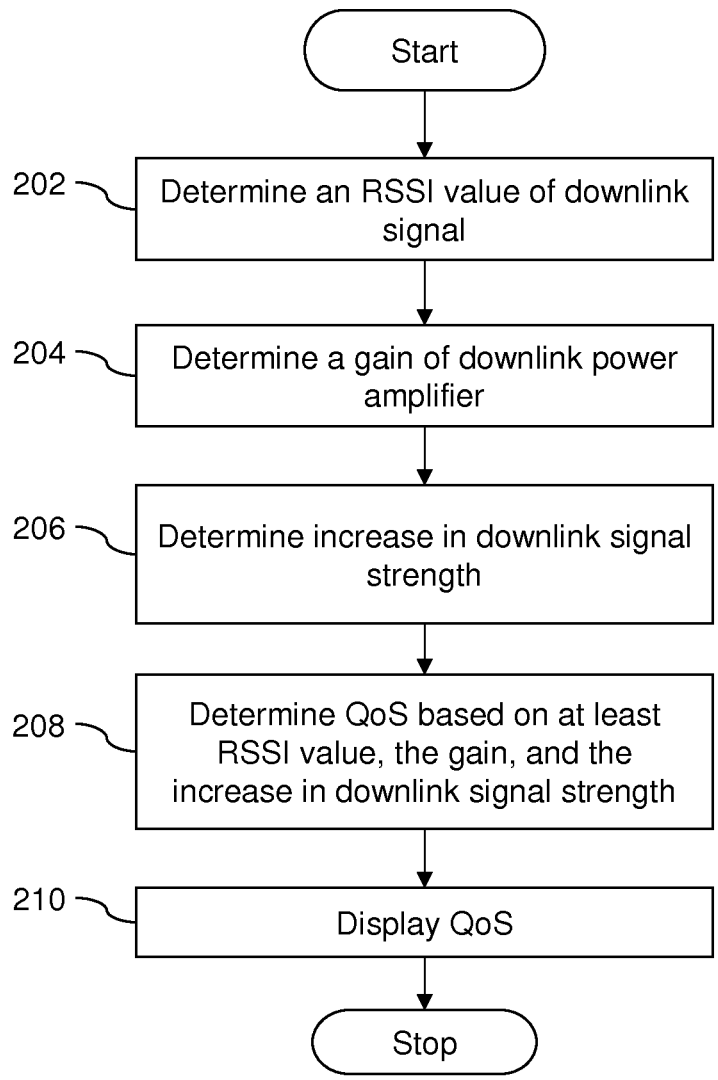
FIG. 2 is a flowchart illustrating a method for determining QoS for a downlink signal in a bidirectional repeater, in accordance with another embodiment of the present invention.

FIG. 2 is a flowchart illustrating a method for determining a QoS for a downlink signal in a bidirectional repeater, in accordance with another embodiment of the present invention. At step 202, an RSSI value associated with the downlink signal is determined. At step 204, a gain of a downlink power amplifier is determined. At step 206, an increase in the RSSI value received by the mobile device associated with the downlink signal is determined. The increase in the RSSI value is with respect to an RSSI value received by the mobile device associated with the downlink signal received by the mobile device without the bi-directional repeater. In an embodiment of the present invention, the increase in the RSSI value received by the mobile device is estimated by using RSSI value and the gain. The estimation of increase in RSSI value received by the mobile device is performed based on experimental data, for example plurality of RSSI values, gain, increase in RSSI value, and QoS, stored in a memory. At step 208, the QoS for the downlink signal is determined based on at least one of the RSSI value of the downlink signal, the gain, and the increase in the RSSI value received by the mobile device. Finally, at step 210 the QoS determined is displayed. In an exemplary embodiment of the present invention, during the development stage of the bidirectional repeater a plurality of RSSI values associated with a downlink signal are determined. Subsequently, a QoS corresponding to each of the plurality of RSSI values is experimentally determined for different gain values of the downlink power amplifier. The plurality of RSSI values, the different gain values and the QoS corresponding to the plurality of RSSI values are stored in the memory within the bi-directional repeater. An increase in the RSSI value received by the mobile device associated with a downlink signal may also be determined. The increase in the RSSI value is with respect to an RSSI value received by the mobile device associated with the downlink signal received by the mobile device without the bi-directional repeater. Subsequently, when the repeater is installed at a customer site, QoS corresponding to the RSSI value is interpolated using the pre-recorded values. The method of interpolating the QoS is explained in detail in conjunction with FIG. 3. In an alternative embodiment of the present invention, the QoS is estimated based on the measured values of at least one of the bit error rate (BER), word error rate (WER), frame error rate (FER), energy-to-interference density ratio (Ec/Io), received strength code power (RSCP), and channel quality indicator (CQI) according to techniques known in the art. In an embodiment of the present invention, according to step 210, the QoS may be displayed by the bi-directional repeater.

Figure 3:
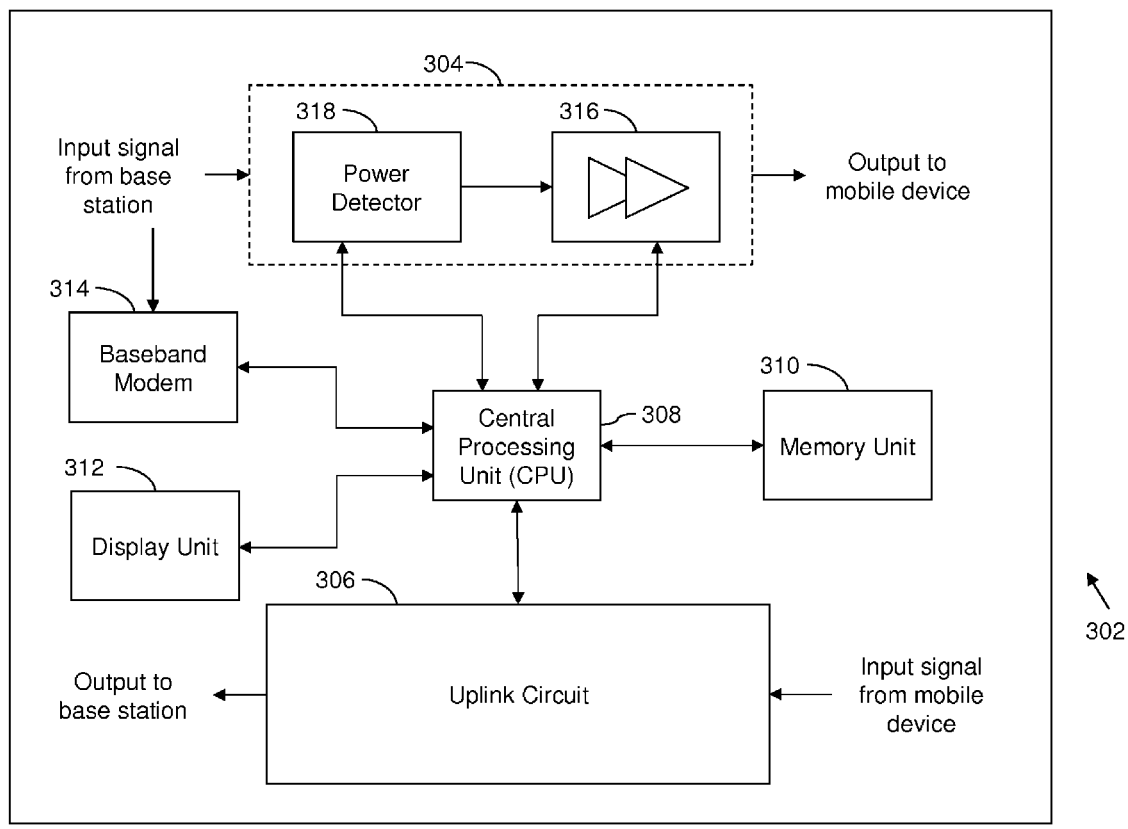
FIG. 3 is a block diagram of a bi-directional repeater, in accordance with an embodiment of the present invention

FIG. 3 is a block diagram of a bi-directional repeater 302, in accordance with an embodiment of the present invention. Bi-directional repeater 302 comprises a downlink circuit 304, an uplink circuit 306, a central processing unit (CPU) 308, a memory unit 310, a display unit 312, and a baseband modem 314. Downlink circuit 304 further comprises a power amplifier 316 and a power detector 318.

Downlink circuit 304 receives a downlink signal from a base station. Power detector 318 measures a received signal strength indicator (RSSI) value associated with the downlink signal. Power amplifier 316 amplifies the downlink signal. The amplified downlink signal is transmitted to a mobile device. Similarly, uplink circuit 306 receives an uplink signal from a mobile device, amplifies it and transmits the amplified uplink signal to the base station. CPU 308 determines a quality of service (QoS) based on the RSSI value and the gain stored in memory 310. CPU 308 further determines an increase in the RSSI value received by the mobile device based on the RSSI value and the gain. The increase in the RSSI value is with respect to an RSSI value received by the mobile device associated with the downlink signal received by the mobile device without the bi-directional repeater. CPU 308 estimates the increase in RSSI value received by the mobile device based on the experimental data stored in memory 308. CPU 308 may also determine the QoS based on this increase in the RSSI value.

Memory 310 stores at least one of the RSSI value, the gain and the increase in the RSSI value. Display unit 312 displays the QoS. Display unit 312 is explained in detail in conjunction with FIGS. 4, 5 and 6. Typically, baseband modem 314 measures at least one of the bit error rate (BER), word error rate (WER), distortion, and multipath errors. In an alternative embodiment, the QoS is estimated based on the measured value of at least one of the bit error rate (BER), word error rate (WER), frame error rate (FER), energy-to-interference density ratio (Ec/Io), received strength code power (RSCP), and channel quality indicator (CQI) according to techniques known in the art.

In an embodiment, bi-directional repeater 302 may be tested with a plurality of test downlink signals having different RSSI values. CPU 308 determines an RSSI value associated with each of these test downlink signals through power detector 318. Further, CPU 308 determines a gain of power amplifier 316. CPU 308 further estimates an increase in the RSSI value received by the mobile device by using the RSSI value associated with the downlink signal and the gain of the power amplifier 316. The increase in the RSSI is with respect to an RSSI value received by the mobile device associated with the downlink signal received by the mobile device without the bi-directional repeater. CPU 308 estimates the increase in RSSI value received by the mobile device by summing RSSI values associated with the downlink signal and the gain of the power amplifier, followed by an adjustment for the loss in downlink signal strength due to travel in air.

CPU 308 maintains a record of the RSSI value associated with each of the test downlink signals, the gain of power amplifier 316 and the experimentally determined QoS in memory unit 310.

In an embodiment of the present invention, the record may be maintained in a tabular format. The table may include the RSSI value associated each of the test downlink signals, the gain of power amplifier 316 and the experimentally measured QoS. When bi-directional repeater 302 is installed at the customer premises, CPU 308 determines QoS of a downlink signal using a two step process of interpolation. The determination of QoS using exemplary data is described below.

CPU 308 obtains data from an exemplary Table-A (shown below) stored in memory unit 310. Table-A includes a plurality of received signal strength (RSSI) values associated with test downlink signals, a plurality of gain values of the downlink power amplifier, a plurality of increase in RSSI values, and the quality of service (QoS), as shown below. Let an exemplary RSSI value associated with a downlink signal be −95 dBm and an exemplary gain of power amplifier 316 be 45 dB. Thereafter, CPU 308 identifies two RSSI values from the Table-A such that the exemplary RSSI value lies between the two RSSI values. Referring to Table-A, the two RSSI values are −90 dBm and −100 dBm. Thereafter, two QoS values, QoS1 and QoS2, are interpolated using the corresponding gain values and the experimentally measured QoS values from Table-A, as shown below:

$$QoS1=(50-45)/(50-40)*(20-10)+20=5/10*10+10=15$$

Where, from left to right, the values on the left side of the equation are as follows:

"50" is the Gain value for RSSI=−100, Gain=50 (i.e., Table-A, col. 2, line 3);
"45" is the Gain for the downlink signal as stated at p. 8, line 12;
"50" is the Gain value for RSSI=−100, Gain=50 (i.e., Table-A, col. 2, line 3);
"40" is the Gain value for RSSI=−100, Gain=40 (i.e., Table-A, col. 2, line 2);
"20" is the QoS value for RSSI=−100, Gain=50 (i.e., Table-A, col. 4, line 3);
"10" is the QoS value for RSSI=−100, Gain=40 (i.e., Table-A, col. 4, line 2); and
"10" is the QoS value for RSSI=−100, Gain=40 (i.e., Table-A, col. 4, line 2).

$$QoS2=(50-45)/(50-40)*(35-25)+20=5/10*10+10=15$$

Where, from left to right, the values on the left side of the equation are as follows:

"50" is the Gain value for RSSI=−90, Gain=50 (i.e., Table-A, col. 2, line 6);
"45" is the Gain for the downlink signal as stated at p. 8, line 12;
"50" is the Gain value for RSSI=−90, Gain=50 (i.e., Table-A, col. 2, line 6);
"40" is the Gain value for RSSI=−90, Gain=40 (i.e., Table-A, col. 2, line 5);
"35" is the QoS value for RSSI=−90, Gain=50 (i.e., Table-A, col. 4, line 6);
"25" is the QoS value for RSSI=−90, Gain=40 (i.e., Table-A, col. 4, line 5); and
"25" is the QoS value for RSSI=−90, Gain=40 (i.e., Table-A, col. 4, line 5).

Subsequently, QoS is interpolated using the exemplary RSSI value associated with the downlink signal, QoS1, and QoS2, as shown below:

$$QoS=(-95-(-100))/(90-(-100))*(30-15)+15=5/10*15+15=22.5$$

Where, from left to right, the values on the left side of the equation are as follows:

"−95" is the RSSI value for the downlink signal as stated on p. 8, line 11;
"−100" is the RSSI value for QoS1 (i.e., Table-A, col. 1, line 1);
"−90" is the RSSI value for QoS2 (i.e., Table-A, col. 1, line 4);
"−100" is the RSSI value for QoS1 (i.e., Table-A, col. 1, line 1);
"30" is the interpolated value computed for QoS2 as shown above;
"15" is the interpolated value computed for QoS2 as shown above; and
"15" is the interpolated value computed for QoS2 as shown above.

Further, let an exemplary increase in RSSI value associated with a downlink signal be −50 dBm. Thereafter, CPU 308 identifies two increases in RSSI values from Table-A such that the exemplary increase in RSSI value lies between the two increases in RSSI values. Referring to Table-A, the two increases in RSSI values are −55 dBm and −40 dBm. Thereafter, QoS value, corresponding to the exemplary increase in RSSI value is interpolated using the experimentally determined QoS values as shown in Table-A.

QoS1=10 (corresponding to −55 dBm) QoS2=20 (corresponding to −40 dBm)

$$QoS=((20-10)/((-40)-(-55)))*(-50-(-40))+20=-6.67+20=13.33$$

Where, from left to right, the values on the left side of the equation are as follows:

"20" is the QoS value for RSSI=−100, Gain=50 (i.e., Table-A, col. 4, line 3);
"10" is the QoS value for RSSI=−100, Gain=40 (i.e., Table-A, col. 4, line 2);
"−40" is the RSSI Increase value for RSSI=−100, Gain=50 (i.e., Table-A, col. 3, line 3);
"−55" is the RSSI Increase value for RSSI=−100, Gain=40 (i.e., Table-A, col. 3, line 2);
"−50" is the RSSI Increase value for the downlink signal as states at p. 8, line 24;
"−40" is the RSSI Increase value for RSSI=−100, Gain=50 (i.e., Table-A, col. 3, line 3); and
"20" is the QoS value for RSSI=−100, Gain=50 (i.e., Table-A, col. 4, line 3).

TABLE A

| RSSI (in dBm) | Gain (in dB) | Increase in RSSI | QoS |
|---|---|---|---|
| −100 | 30 | −60 | 0 |
|  | 40 | −55 | 10 |
|  | 50 | −40 | 20 |
| −90 | 30 | −35 | 15 |
|  | 40 | −40 | 25 |
|  | 50 | −45 | 35 |
| −80 | 30 | −40 | 30 |
|  | 40 | −45 | 40 |
|  | 50 | −50 | 50 |
| −70 | 30 | −45 | 40 |
|  | 40 | −50 | 60 |
|  | 50 | −55 | 70 |

Further, it may be noted that the values in the Table-A are exemplary values and that one ordinarily skilled in the art would be able to estimate the QoS using one or more mathematical formulae known in the art.

Figure 4:
FIG. 4 is a block diagram of a light emitting diode (LED) indicator displaying QoS, in accordance with an embodiment of the present invention.
Figure 5:
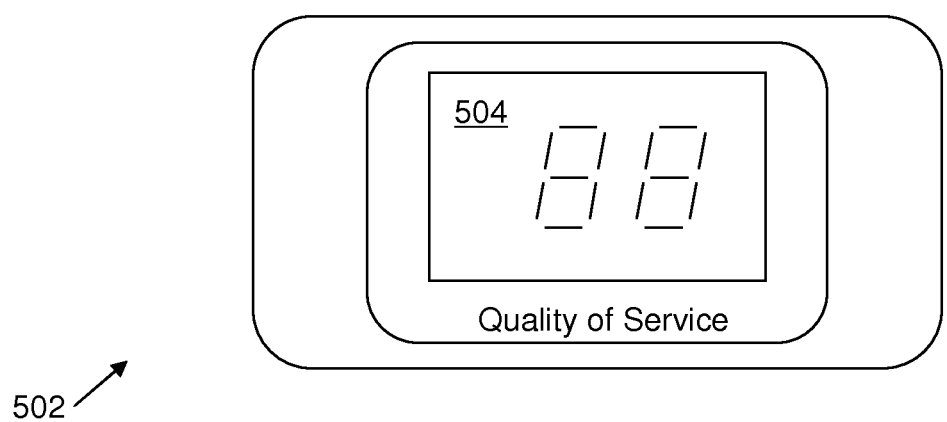
FIG. 5 is a block diagram of a liquid crystal display (LCD) indicator displaying QoS, in accordance with an embodiment of the present invention.
Figure 6:
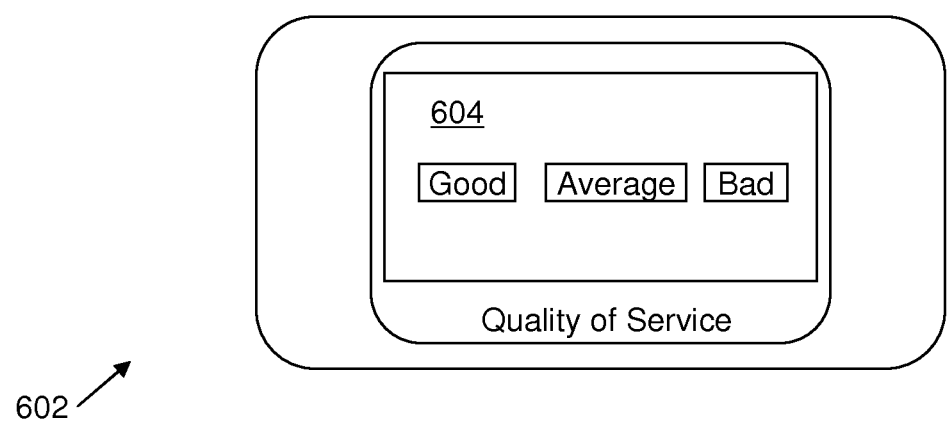
FIG. 6 is a block diagram of a special symbol indicator displaying QoS, in accordance with an embodiment of the present invention.

FIGS. 4, 5, and 6 are block diagrams of various types of indicators that can be used for displaying QoS, in accordance with embodiments of the present invention. FIG. 4 is a light emitting diode (LED) indicator 402 for displaying QoS. LED indicator 402 comprises a display area 404 for displaying QoS. Display area 404 comprises a transparent region 406 of a plurality of transparent regions lighted by LEDs from behind (not shown in FIG. 4) display area 404. In an embodiment of the present invention, the higher the QoS, the more will be the number of highlighted transparent regions. FIG. 5 is a liquid crystal display (LCD) indicator 502 for displaying QoS. LCD indicator 502 comprises a display area 504 for displaying QoS. The QoS is displayed as a numeric value indicating a suitable estimate of QoS. FIG. 6 is a special symbol indicator 602 for displaying QoS. Special symbol indicator 602 comprises a display area 604 for displaying QoS. Display area 604 comprises a plurality of special symbols for indicating QoS. In an embodiment of the present invention, special symbols can be 'GOOD', 'AVERAGE', and 'BAD'. In another embodiment, special symbol indicator 602 displays QoS in alphanumeric format as well.

Various embodiments of the present invention have numerous advantages. The bi-directional repeater of the present invention includes a QoS indicator. The QoS indicator displays the QoS with respect to RSSI value associated with the downlink signal and the gain of the power amplifier. Thus, during the installation of the bi-directional repeater a suitable location can be chosen based on the QoS displayed by QoS indicator. Also, the present invention displays the QoS based on the increase in the RSSI value received by the mobile device, thereby facilitating the installation procedure of the bi-directional repeater even more.

In various embodiments of the present invention, bi-directional repeater 302 may operate according to at least one of the Universal Mobile Telecommunications System (UMTS), Global System for Mobile communications (GSM), Code Division Multiple Access (CDMA), High Speed Downlink Packet Access (HSDPA), Evolution-Data Optimized (EVDO), Long term evolution (LTE) and Worldwide Interoperability for Microwave Access (WiMAX) standards.

While various embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for estimating a quality of service (QoS) experienced by a mobile device receiving a downlink signal repeated by a bi-directional repeater, the bi-directional repeater comprising a downlink power amplifier, the method comprising:
   receiving the downlink signal from a base station at the bi-directional repeater;
   amplifying and repeating the downlink signal for receipt by the mobile device;
   determining a received signal strength indicator (RSSI) value associated with the downlink signal received by the bi-directional repeater;
   determining a gain of the downlink power amplifier;
   estimating the QoS experienced by the mobile device without using any parameters measured at the mobile device itself based on the RSSI value, the gain, and an adjustment for loss in downlink signal strength due to travel in air between the bi-directional repeater and the mobile device; and
   estimating an increase in downlink signal strength received by the mobile device without using any parameters measured at the mobile device itself based on the RSSI value and the gain, wherein the estimated increase in downlink signal strength received by the mobile device is with respect to a an estimated downlink signal strength received by the mobile device without the bi-directional repeater.

2. The method according to claim 1, wherein the estimation of the increase in downlink signal strength received by the mobile device is further based on additional information comprising experimental data pertaining to the mobile device stored in memory at the bi-directional repeater.

3. The method according to claim 1, wherein the estimation of the QoS at the mobile device is further based on additional information comprising experimental data pertaining to the mobile device stored in memory at the bi-directional repeater.

4. The method according to claim 1 wherein the estimation of the QoS at the mobile device is further based on additional information comprising at least one of a bit error rate (BER), word error rate (WER), distortion, and multipath errors pertaining to quality of the downlink signal received at the bi-directional repeater.

5. The method according to claim 1 further comprising displaying the QoS.

6. A method for estimating a quality of service (QoS) experienced by a mobile device receiving a downlink signal in repeated by a bi-directional repeater, the bi-directional repeater comprising a downlink power amplifier, the method comprising:
   receiving the downlink signal from a base station at the bi-directional repeater;
   amplifying and repeating the downlink signal for receipt by the mobile device;
   determining a received signal strength indicator (RSSI) value associated with the downlink signal received by the bi-directional repeater;
   determining a gain of the downlink power amplifier;
   determining an increase in downlink signal strength transmitted to the mobile device by the bi-directional repeater based on the RSSI value and-the gain;
   estimating the QoS for the mobile device without using any parameters measured at the mobile device itself based on the estimated increase in the downlink signal strength transmitted to the mobile device by the bi-directional repeater and an adjustment for loss in downlink signal strength due to travel in air between the bi-directional repeater and the mobile device; and estimating an increase in downlink signal strength received by the mobile device without using any parameters measured at the mobile device itself based on the RSSI value and the gain, wherein the estimated increase in downlink signal strength received by the mobile device is with respect to a an estimated downlink signal strength received by the mobile device without the bi-directional repeater.

7. The method according to claim 6, wherein the estimation of the QoS at the mobile device is further based on additional information comprising experimental data pertaining to the mobile device stored in memory at the bi-directional repeater.

8. The method according to claim 6 further comprising estimating the QoS for the mobile device based on at least one of a bit error rate (BER), word error rate (WER), distortion, and multipath errors pertaining to quality of the received signal at the bi-directional repeater.

9. The method according to claim 6 further comprising displaying the QoS.

10. A bi-directional repeater for amplifying signals between a mobile device and a base station, the bi-directional repeater comprising:
   a downlink circuit, the downlink circuit amplifying downlink signals from the base station to the mobile device;
   a power detector, configured for measuring a received signal strength indicator (RSSI) value associated with a downlink signal;
   a downlink power amplifier, configured for amplifying the downlink signal;
   a central processing unit (CPU), configured for estimating a quality of service (QoS) experienced by the mobile device without using any parameters measured at the mobile device itself based on the RSSI value, and a gain of the downlink power amplifier, and an adjustment for loss in downlink signal strength due to travel in air between the bi-directional repeater and the mobile device;
   wherein the CPU is further configured to estimate determines an increase in the downlink signal strength received by the mobile device based on the RSSI value and the gain, wherein the estimated increase in downlink signal strength received by the mobile device is with respect to an estimated downlink signal strength received by the mobile device without the bi-directional repeater; and
   a display unit, configured for displaying the QoS.

11. The bi-directional repeater according to claim 10, wherein the additional information comprises experimental data pertaining to the mobile device stored in memory at the bi-directional repeater.

12. The bi-directional repeater according to claim 10, wherein the additional information comprises experimental data pertaining to the mobile device stored in memory at the bi-directional repeater.

13. The bi-directional repeater according to claim 10 further comprising a baseband modem, the baseband modem measuring at least one of a bit error rate (BER), word error rate (WER), distortion, and multipath errors.

14. The bi-directional repeater according to claim 13, wherein the CPU determines QoS based on at least one of the bit error rate (BER), word error rate (WER), distortion, and multipath errors.

15. The bi-directional repeater according to claim 10 further comprising a memory unit, the memory unit storing at least one of the RSSI value, the gain and the increase in the downlink signal strength.

16. The bi-directional repeater according to claim 10, wherein the display unit comprises at least one of a light emitting diode (LED) display, a liquid crystal display (LCD), and a special symbol display.

17. The bi-directional repeater according to claim 10, wherein the bi-directional repeater operates according to at least one of Universal Mobile Telecommunications System (UMTS), Global System for Mobile communications (GSM), Code Division Multiple Access (CDMA), High Speed Downlink Packet Access (HSDPA), Evolution-Data Optimized (EVDO), Long term evolution (LTE) and Worldwide Interoperability for Microwave Access (WiMAX) standards.

* * * * *